US009998655B2

(12) United States Patent
Scharl et al.

(10) Patent No.: US 9,998,655 B2
(45) Date of Patent: Jun. 12, 2018

(54) VISUALIZATION FOR VIEWING-GUIDANCE DURING DATASET-GENERATION

(71) Applicant: QUALCOMM Incorporated, San Diego, CA (US)

(72) Inventors: Johannes Scharl, Vienna (AT); Irene Reisner-Kollmann, Vienna (AT); Zsolt Szalavari, Vienna (AT)

(73) Assignee: QUALLCOMM Incorporated, San Diego, CA (US)

( * ) Notice: Subject to any disclaimer, the term of this patent is extended or adjusted under 35 U.S.C. 154(b) by 504 days.

(21) Appl. No.: 14/678,654

(22) Filed: Apr. 3, 2015

(65) Prior Publication Data

US 2016/0182817 A1 Jun. 23, 2016

Related U.S. Application Data

(60) Provisional application No. 62/096,341, filed on Dec. 23, 2014.

(51) Int. Cl.
*H04N 5/232* (2006.01)
*G01B 11/24* (2006.01)

(52) U.S. Cl.
CPC ......... *H04N 5/23222* (2013.01); *G01B 11/24* (2013.01); *H04N 5/23293* (2013.01)

(58) Field of Classification Search
CPC .. H04N 5/23238; G06T 3/4038; G03B 37/02; B64C 2201/127
See application file for complete search history.

(56) References Cited

U.S. PATENT DOCUMENTS 5,923,331 A * 7/1999 Dusseux ................. G06T 15/06
345/421
6,317,139 B1 11/2001 Williams
(Continued)

FOREIGN PATENT DOCUMENTS

JP 2010219825 A 9/2010
JP 2014-3715 A * 1/2014
WO 2011014421 A2 2/2011

OTHER PUBLICATIONS

International Search Report and Written Opinion—PCT/US2015/064894—ISA/EPO—dated Feb. 18, 2016.

*Primary Examiner* — David Harvey
(74) *Attorney, Agent, or Firm* — Austin Rapp

(57) ABSTRACT

Disclosed is a method and apparatus for providing visual guidance to a user capturing images of a three-dimensional object. In one embodiment, the operations implemented may include: generating a virtual registered sphere comprising a plurality of contiguous patches, wherein each of the plurality of patches corresponds to a continuous range of image capture angles; rendering at least a portion of the virtual registered sphere in an image capture camera view; determining whether images of the three-dimensional object have been captured to a predetermined satisfactory degree from a particular range of image capture angles associated with a particular patch; and assigning a color to the particular patch based at least in part on the determination of whether images of the three-dimensional object have been captured to the predetermined satisfactory degree from the particular range of image capture angles associated with the particular patch.

20 Claims, 4 Drawing Sheets

(56) References Cited

U.S. PATENT DOCUMENTS

| | | | | |
|---|---|---|---|---|
| 6,664,986 | B1* | 12/2003 | Kopelman | A61C 9/0046 715/849 |
| 7,102,666 | B2* | 9/2006 | Kanade | G03B 41/00 348/142 |
| 7,424,218 | B2* | 9/2008 | Baudisch | G03B 13/02 348/218.1 |
| 7,620,234 | B2 | 11/2009 | Taylor | |
| 7,639,897 | B2* | 12/2009 | Gennetten | H04N 5/232 348/36 |
| 8,068,694 | B2* | 11/2011 | Zhang | H04N 5/23232 382/284 |
| 8,675,951 | B2 | 3/2014 | Van Den Hengel et al. | |
| 9,253,398 | B2* | 2/2016 | Matsumoto | |
| 9,554,040 | B2* | 1/2017 | Mihara | H04N 5/23238 |
| 9,667,862 | B2* | 5/2017 | Rapoport | H04N 5/23222 |
| 2004/0070583 | A1 | 4/2004 | Tsai et al. | |
| 2005/0013507 | A1* | 1/2005 | Lee | G06K 9/6255 382/284 |
| 2005/0031194 | A1* | 2/2005 | Lee | G06T 17/00 382/154 |
| 2006/0132675 | A1* | 6/2006 | Choi | G06F 1/1626 349/76 |
| 2009/0058990 | A1* | 3/2009 | Kim | G03B 37/04 348/36 |
| 2009/0109240 | A1 | 4/2009 | Englert et al. | |
| 2011/0228123 | A1* | 9/2011 | Matsumoto | H04N 5/23238 348/222.1 |
| 2011/0312374 | A1* | 12/2011 | Chen | H04N 5/23222 455/556.1 |
| 2012/0293549 | A1* | 11/2012 | Osako | H04N 13/0275 345/633 |
| 2012/0293632 | A1* | 11/2012 | Yukich | H04N 13/0493 348/47 |
| 2013/0107020 | A1 | 5/2013 | Hashimoto | |
| 2013/0329014 | A1* | 12/2013 | Obata | H04M 1/72522 348/46 |
| 2014/0267593 | A1* | 9/2014 | Kim | H04N 5/23238 348/36 |
| 2014/0368620 | A1* | 12/2014 | Li | H04N 13/0282 348/50 |
| 2015/0130799 | A1* | 5/2015 | Holzer | G06F 3/04842 345/420 |
| 2015/0170405 | A1* | 6/2015 | Hu | H04N 5/76 345/427 |
| 2015/0296141 | A1* | 10/2015 | Zhang | G06T 3/4038 348/39 |

* cited by examiner

VISUALIZATION FOR VIEWING-GUIDANCE DURING DATASET-GENERATION

CROSS REFERENCE TO RELATED APPLICATION

This application claims priority to U.S. provisional patent application No. 62/096,341, which was filed on Dec. 23, 2014 and is incorporated herein by reference in its entirety.

FIELD

Embodiments of the present disclosure relate generally to object capturing. In particular, embodiments of the disclosure relate to methods for visualization for viewing-guidance during dataset-generation.

BACKGROUNDS

A dataset in relation to a three-dimensional object may be generated by capturing images of the object with an image capturing device from a plurality of angles. Such a dataset may include features extracted from images of the object captured from different angles and may be useful in a number of applications. For example, the dataset may be used to detect the presence of the three-dimensional object in an Augmented Reality application. The dataset as described above may be used by the Augmented Reality application or an associated application to determine, e.g., the pose of the three-dimensional object in the camera view.

As described above, to generate the dataset, images of the object are taken from different angles. Guidance and feedback information in relation to whether images of the object has been captured to a satisfactory degree at a particular angle may be helpful to a user that is capturing the images of the object from different angles. Images of the object has been captured to a satisfactory degree at a particular angle when the resulting dataset can be used for a particular purpose for the particular angle with a predetermined success rate or better. One such purpose may be, for example, to detect the three-dimensional object and its pose in a camera view at a particular angle using the dataset. Further guidance in relation to the quality of the captured information for a particular angle and/or a particular distance may also be helpful. Known methods may require the user capturing the images of the object to have an intimate knowledge regarding feature extraction and related processing. A method that provides more intuitive guidance that is less demanding on the user may be useful.

SUMMARY

An embodiment disclosed herein may include a method for providing visual guidance to a user capturing images of a three-dimensional object comprising: generating a virtual registered sphere comprising a plurality of contiguous patches, wherein each of the plurality of patches corresponds to a continuous range of image capture angles; rendering at least a portion of the virtual registered sphere in an image capture camera view; determining whether images of the three-dimensional object have been captured to a predetermined satisfactory degree from a particular range of image capture angles associated with a particular patch; and assigning a color to the particular patch based at least in part on the determination of whether images of the three-dimensional object have been captured to the predetermined satisfactory degree from the particular range of image capture angles associated with the particular patch.

Another embodiment disclosed herein may include an apparatus for providing visual guidance to a user capturing images of a three-dimensional object comprising: a memory; and a processor to: generate a virtual registered sphere comprising a plurality of contiguous patches, wherein each of the plurality of patches corresponds to a continuous range of image capture angles, render at least a portion of the virtual registered sphere in an image capture camera view, determine whether images of the three-dimensional object have been captured to a predetermined satisfactory degree from a particular range of image capture angles associated with a particular patch, and assign a color to the particular patch based at least in part on the determination of whether images of the three-dimensional object have been captured to the predetermined satisfactory degree from the particular range of image capture angles associated with the particular patch.

A further embodiment disclosed herein may include an apparatus for providing visual guidance to a user capturing images of a three-dimensional object comprising: means for generating a virtual registered sphere comprising a plurality of contiguous patches, wherein each of the plurality of patches corresponds to a continuous range of image capture angles; means for rendering at least a portion of the virtual registered sphere in an image capture camera view; means for determining whether images of the three-dimensional object have been captured to a predetermined satisfactory degree from a particular range of image capture angles associated with a particular patch; and means for assigning a color to the particular patch based at least in part on the determination of whether images of the three-dimensional object have been captured to the predetermined satisfactory degree from the particular range of image capture angles associated with the particular patch.

An additional embodiment disclosed herein may include a non-transitory computer-readable medium including code that, when executed by a processor, causes the processor to: generate a virtual registered sphere comprising a plurality of contiguous patches, wherein each of the plurality of patches corresponds to a continuous range of image capture angles, render at least a portion of the virtual registered sphere in an image capture camera view, determine whether images of the three-dimensional object have been captured to a predetermined satisfactory degree from a particular range of image capture angles associated with a particular patch, and assign a color to the particular patch based at least in part on the determination of whether images of the three-dimensional object have been captured to the predetermined satisfactory degree from the particular range of image capture angles associated with the particular patch.

DETAILED DESCRIPTION

The word "exemplary" or "example" is used herein to mean "serving as an example, instance, or illustration." Any aspect or embodiment described herein as "exemplary" or as an "example" in not necessarily to be construed as preferred or advantageous over other aspects or embodiments.

As used herein, the term "computing system or device" refers to any form of programmable computer device including but not limited to laptop and desktop computers, tablets, smartphones, televisions, home appliances, cellular telephones, personal television devices, personal data assistants (PDA's), palm-top computers, wireless electronic mail receivers, multimedia Internet enabled cellular telephones, Global Positioning System (GPS) receivers, wireless gaming controllers, receivers within vehicles (e.g., automobiles), interactive game devices, notebooks, smartbooks, netbooks, mobile television devices, or any data processing apparatus.

Figure 1:
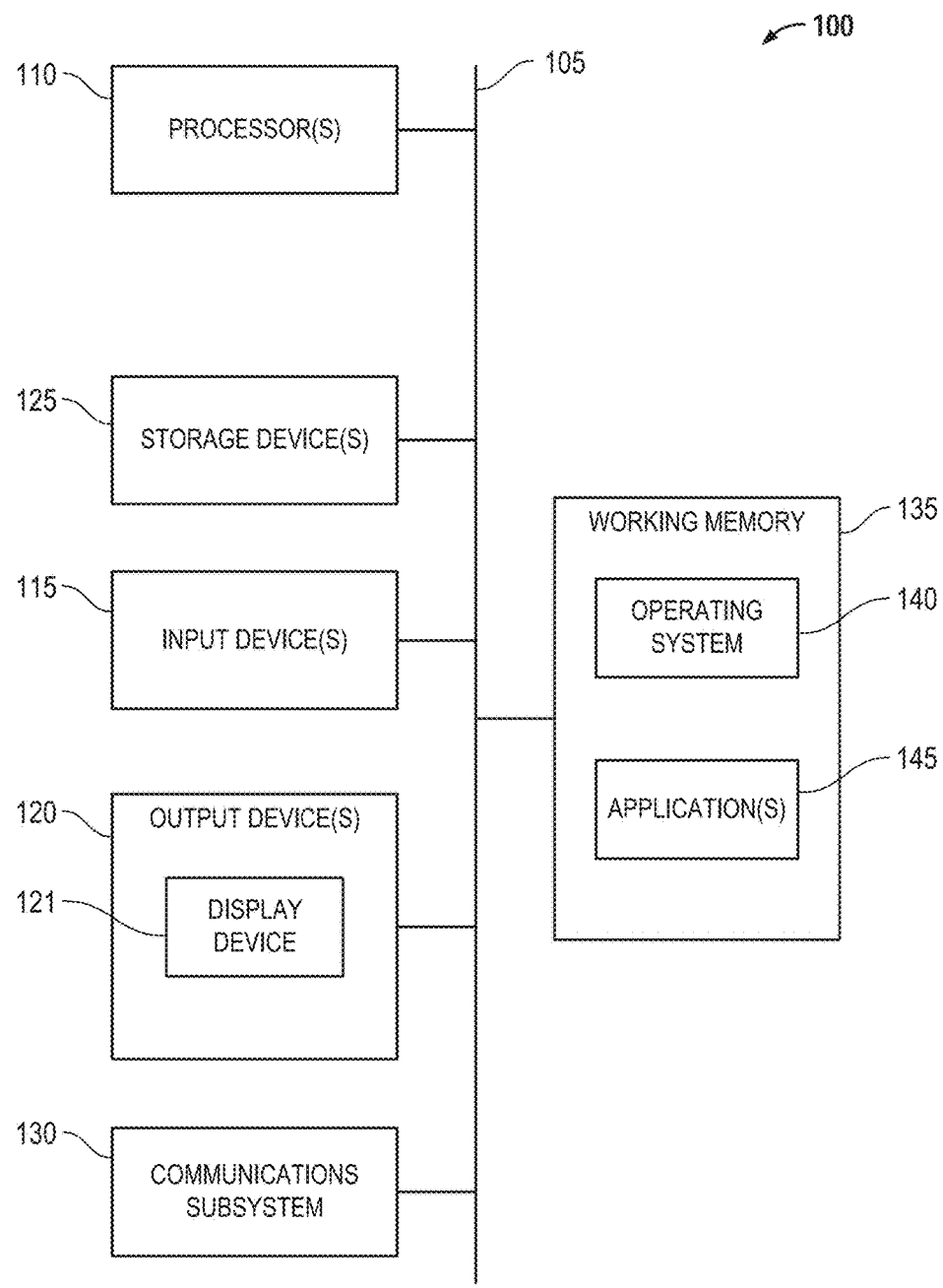
FIG. 1 illustrates an embodiment of a computing device where embodiments of the disclosure may be practiced.

An example computing device 100 adapted for methods for visualization for viewing-guidance during dataset-generation is illustrated in FIG. 1. The computing device 100 is shown comprising hardware elements that can be electrically coupled via a bus 105 (or may otherwise be in communication, as appropriate). The hardware elements may include one or more processors 110, including without limitation one or more general-purpose processors and/or one or more special-purpose processors (such as digital signal processing chips, graphics acceleration processors, and/or the like); one or more input devices 115, which can include without limitation one or more sensors, a mouse, a keyboard, keypad, touch-screen, gesture input device, microphone, camera, and/or the like; and one or more output devices 120, which can include without limitation a display device 121, a speaker, a printer, and/or the like.

The computing device 100 may further include (and/or be in communication with) one or more non-transitory storage devices 125, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including without limitation, various file systems, database structures, and/or the like.

The computing device may also include a communication subsystem 130, which can include without limitation a modem, a network card (wireless or wired), an infrared communication device, a wireless communication device and/or chipset (such as a Bluetooth device, an 802.11 device, a Wi-Fi device, a WiMax device, cellular communication devices, etc.), and/or the like. The communications subsystem 130 may permit data to be exchanged with a network, other computing devices, and/or any other devices described herein. In one embodiment, the computing device 100 may further comprise a working memory 135, which can include a RAM or ROM device, as described above. It should be appreciated that computing device 100 may be a mobile device or a non-mobile device, and may have wireless and/or wired connections.

The computing device 100 may also comprise software elements, shown as being currently located within the working memory 135, including an operating system 140, device drivers, executable libraries, and/or other code, such as one or more application programs 145, which may comprise or may be designed to implement methods, and/or configure systems, provided by embodiments, as will be described herein. Merely by way of example, one or more procedures described with respect to the method(s) discussed below might be implemented as code and/or instructions executable by computing device 100 (and/or a processor 110 within computing device 100); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 125 described above. In some cases, the storage medium might be incorporated within a computing device, such as the system 100. In other embodiments, the storage medium might be separate from a computing device (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computerized computing device 100 and/or might take the form of source and/or installable code, which, upon compilation and/or installation on the computing device 100 (e.g., using any of a variety of generally available compilers, installation programs, compression/decompression utilities, etc.), then takes the form of executable code.

Embodiments of the disclosure generate a virtual registered sphere and render the virtual sphere, or a relevant portion of the virtual sphere, in the image capture camera view to guide a user in capturing images of a three-dimensional object from different angles. The virtual sphere is divided into a plurality of contiguous patches, each of which is associated with a continuous range of image capture angles in an intuitive fashion. At the time of initialization, all patches on the virtual sphere are assigned a first color and are displayed as such in the image capture camera view to indicate that images of the object have not been captured to a satisfactory degree from any angle. When images of the object have been captured from a particular continuous range of angles associated with a patch on the virtual sphere to a satisfactory degree, the patch is then assigned a second color that is different from the first color and is displayed as such to indicate that images of the object have been captured from the particular continuous range of angles to a satisfactory degree. It may be determined that images of the object have been captured from a particular continuous range of angles to a satisfactory degree when a quality value associated with a dataset generated based on and/or comprising the images exceeds a predetermined threshold. That images of the object have been captured to a satisfactory degree at a particular angle indicates that the resulting dataset can be used for a particular purpose for the particular angle with a predetermined success rate or better. One such purpose may be, for example, to detect the three-dimensional object and/or its pose in a camera view at a particular angle using the dataset.

Figure 2:
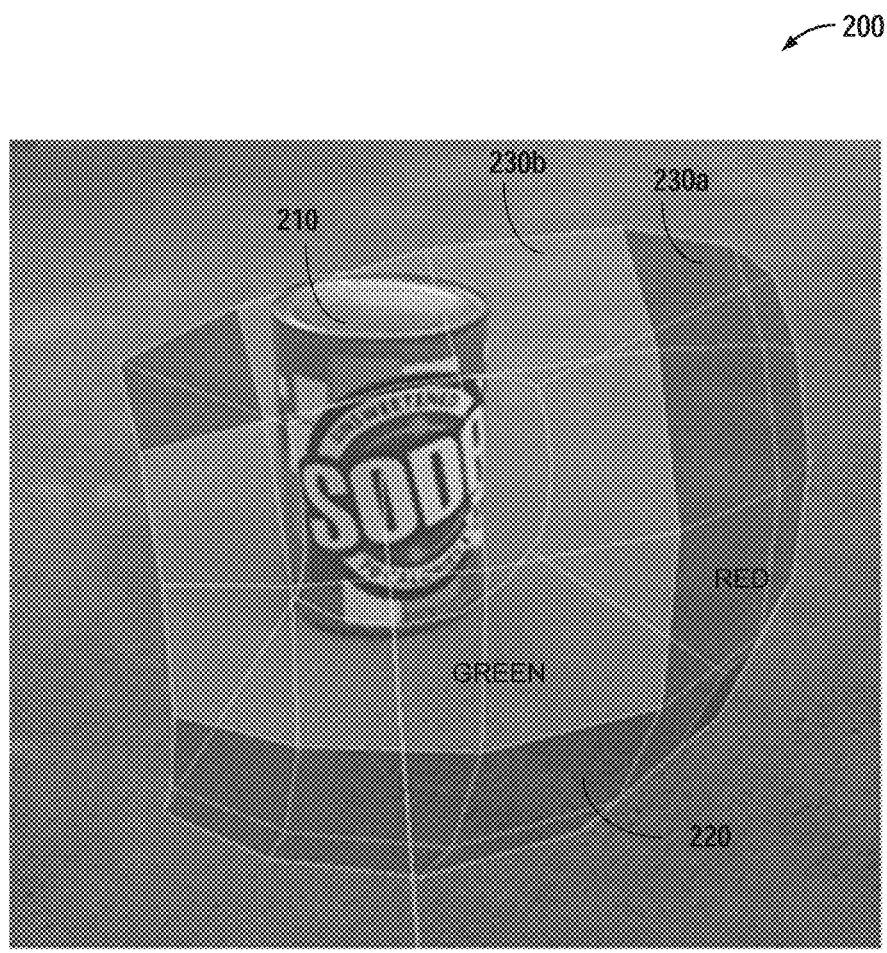
FIG. 2 illustrates an exemplary image capture camera view.

Referring to FIG. 2, an exemplary image capture camera view 200 is shown. A three-dimensional object, a metal can 210, can be seen in image capture camera view 200. A portion of a virtual guidance registered sphere 220 is rendered around the metal can 210 to guide a user in the process of capturing images of the metal can 210 from different angles so that a dataset for the metal can 210 may be generated. The virtual guidance registered sphere 220 is divided into a plurality of patches 230, each of which is associated with a continuous range of angles. As can be seen in FIG. 2, some of the patches 230a are rendered in a first color, red, to indicate that images of the metal can 210 have not been captured to a satisfactory degree from the particular ranges of angles associated with these patches 230a. Some other patches 230b are rendered in a second color, green, to indicate that images of the metal can 210 have been captured to a satisfactory degree from the particular ranges of angles associated with these patches 230b.

Figure 3:
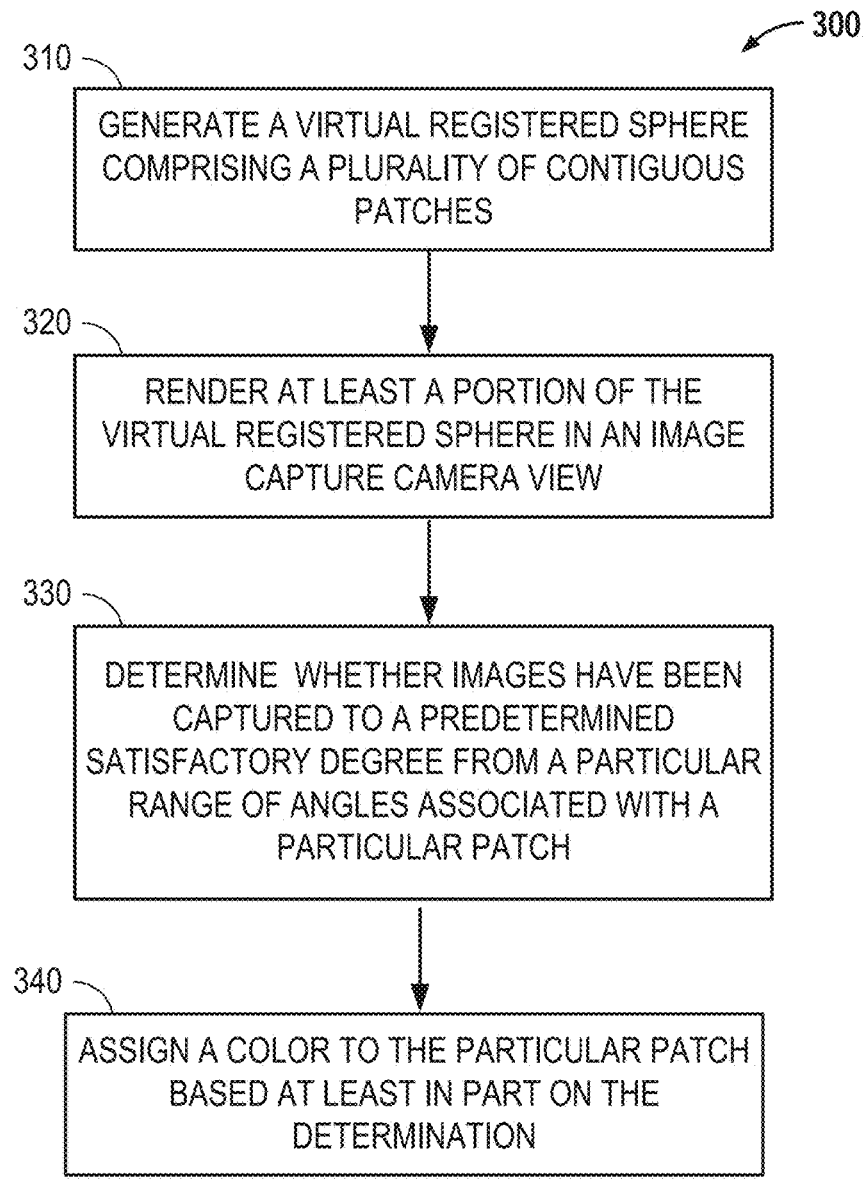
FIG. 3 is a flowchart illustrating an exemplary method for run-time adaptive non-uniform mapping of user interface events.

Referring to FIG. 3, a flowchart illustrating an exemplary method 300 for providing visual guidance to a user capturing images of a three-dimensional object is shown. At block 310, a virtual registered sphere comprising a plurality of contiguous patches is generated, wherein each of the plurality of patches corresponds to a continuous range of image capture angles. In one embodiment, the center of the virtual registered sphere may be at the centroid of a three-dimensional object being captured, and the three-dimensional object may be completely inside the virtual sphere when rendered in a camera view. At block 320, at least a portion of the virtual registered sphere is rendered in an image capture camera view. Next, at block 330, for each patch, it is determined whether images of a three-dimensional object have been captured to a satisfactory degree from the range of image capture angles associated with the patch. It may be determined that images of the object have been captured from a particular continuous range of angles to a satisfactory degree when a quality value associated with a dataset generated based on and/or comprising the images exceeds a predetermined threshold. That images of the object have been captured to a satisfactory degree for a particular range of angles indicates that the resulting dataset can be used for a particular purpose for the particular range of angles with a predetermined success rate or better. Thereafter, at block 340, a color is assigned to each patch based at least in part on the determination of whether images of the three-dimensional object have been captured to a satisfactory degree from the range of image capture angles associated with the patch. If it is determined that images of the three-dimensional object have not been captured to a satisfactory degree from the range of image capture angles associated with the patch, the patch is assigned a first color, such as red; if it is determined that images of the three-dimensional object have been captured to a satisfactory degree from the range of image capture angles associated with the patch, the patch is assigned a second color that is different from the first color, such as green.

Embodiments of the disclosure may be adapted to further provide information about the quality of the portion of the dataset generated from images of the three-dimensional object captured from particular angles with finer granularity using the virtual registered sphere. For a particular angle, the quality of the portion of the dataset associated with the angle may be a value related to, for example, how well the dataset may be used to detect the three-dimensional object and/or its pose in a camera view at the particular angle. A plurality of colors assigned to patches on the virtual sphere may be used to represent dataset information of different qualities. For example, a first color may indicate a poor quality; a second color may indicate a mediocre quality; and a third color may indicate a good quality. The first, the second, and the third colors may be different from each other. It should be noted that the embodiment is not limited by the number of colors used. More colors than three may be used to represent different dataset qualities with even finer granularity. Therefore, instead of merely indicating whether images of the three-dimensional object have been captured to a satisfactory degree from different image capture angles, the virtual registered sphere may be adapted to inform the user capturing the images about how well images of the three-dimensional object have been captured from different image capture angles.

Figure 4:
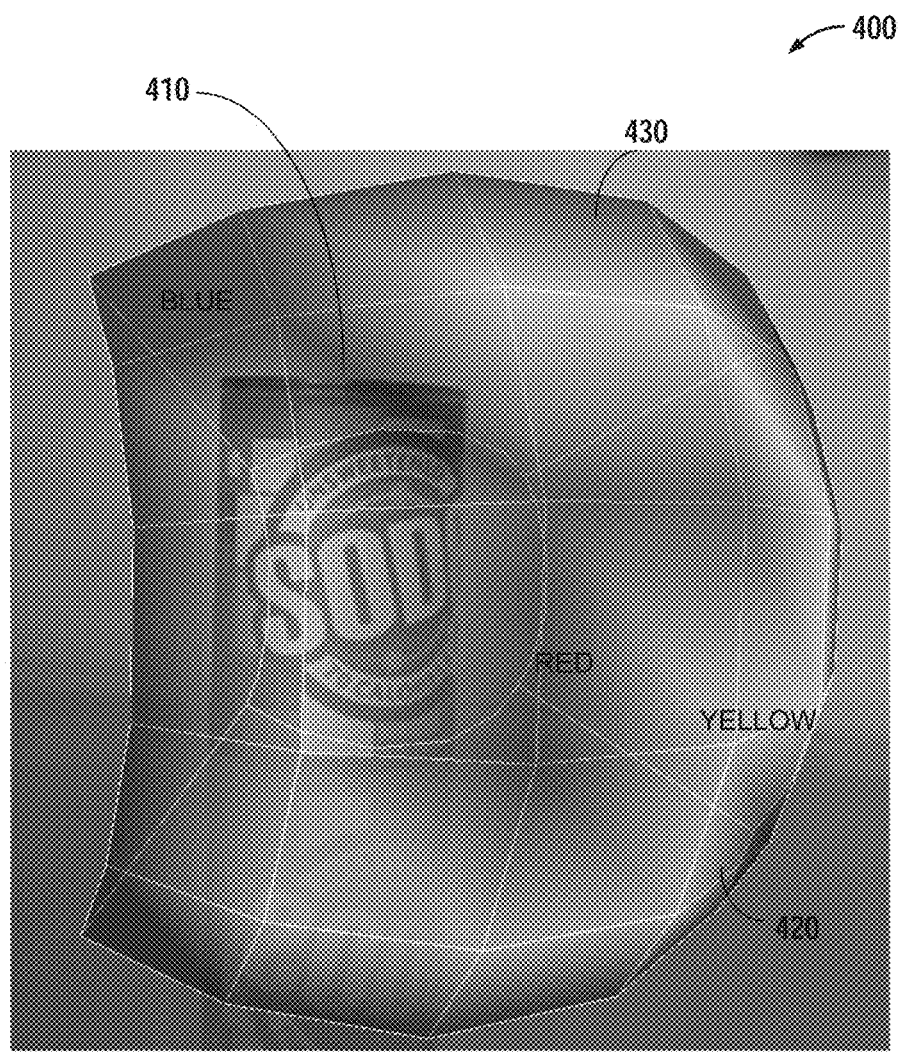
FIG. 4 illustrates an exemplary image capture camera view.

Referring to FIG. 4, an exemplary image capture camera view 400 is shown. Compared with FIG. 2, FIG. 4 shows a virtual guidance registered sphere 420 with patches 430 that are assigned more than two colors, so that instead of merely indicating whether images of the three-dimensional object 410 have been captured to a satisfactory degree from different image capture angles, the virtual registered sphere 420 may inform the user capturing the images about how well images of the three-dimensional object 410 have been captured from different image capture angles. As can be seen in FIG. 4, some patches 430 have a blue color, which may indicate that the associated portion of the dataset has a poor quality. In some embodiments, this may indicate that detecting the three-dimensional object 410 and/or its pose in a camera view at the corresponding range of angles using the dataset may be difficult and unlikely to succeed. Some other patches 430 have a yellow color, which may indicate that the associated portion of the dataset has a mediocre quality. In some embodiments, this may indicate that detecting the three-dimensional object 410 and/or its pose at the corresponding range of angles using the dataset may have a moderate chance of success. Some further patches 430 have a red color, which may indicate that the associated portion of the dataset has a good quality. In some embodiments, this may indicate that detecting the three-dimensional object 410 and/or its pose at the corresponding range of angles using the dataset may have a good chance of success. Therefore, compared with the virtual guidance registered sphere 220 of FIG. 2, the virtual guidance registered sphere 420 of FIG. 4 may provide guidance information to the user capturing images of the three-dimensional object with finer granularity.

Further adaptations to embodiments of the disclosure have also been contemplated. For example, instead of a virtual registered sphere, other three-dimensional or even two-dimensional shapes may be used. As an example of a three-dimensional shape, a virtual cube may be used.

Moreover, embodiments of the disclosure as illustrated in FIG. 4 and described above may be adapted to provide separate guidance information for different distances between the three-dimensional object and the image capturing device, such as device 100. In one embodiment, a plurality of virtual guidance registered spheres may be generated, and each sphere may correspond to a particular distance between the three-dimensional object and the image capturing device. The plurality of virtual spheres may be concentric, and their center may be at the centroid of the three-dimensional object. A virtual sphere corresponding to a shorter distance may be smaller (e.g., have a smaller radius) than a virtual sphere corresponding to a longer distance. In one embodiment, the three-dimensional object may be completely inside the smallest sphere when rendered in a camera view. The user capturing images of the virtual object may toggle between the virtual spheres in the image capture camera view by, for example, moving the image capturing device closer to or away from the three-dimensional object, and the corresponding virtual sphere would be rendered in the image capture camera view. Therefore, dataset information quality at different camera distances may be provided to the user.

It has also been contemplated that guidance information for different distances between the three-dimensional object and the image capturing device may be provided on a same virtual registered sphere. One exemplary method for achieving this is to use color-coded symbols or characters rendered on patches of the virtual sphere. The symbol or character may indicate a relative or absolute camera distance, and the color of the symbol or character may indicate the quality of the portion of the dataset associated with the distance as indicated by the symbol or character and the angle range as indicated by the patch. The color coding scheme may be the same as those described above. For example, a red "+" symbol on a patch may indicate that the portion of the dataset corresponding to the same angles as the patch indicates but a shorter distance has a high quality, and a blue "−" symbol on another patch may indicate that the portion of the dataset corresponding to the same angle range as the patch indicates but a longer distance has a poor quality.

Therefore, embodiments of the disclosure provide intuitive visual guidance information to a user capturing images of a three-dimensional object from multiple angles. With the assistance of embodiments of the disclosure, the user may intuitively apprehend the status of the dataset generated from the images he or she has captured. It should also be appreciated that embodiments of the disclosure may also be used during Augmented Reality authoring and run time.

One embodiment is related to an apparatus (e.g., device 100) for providing visual guidance to a user capturing images of a three-dimensional object comprising: a memory 135; and a processor 110 to: generate a virtual registered sphere comprising a plurality of contiguous patches, wherein each of the plurality of patches corresponds to a continuous range of image capture angles, render at least a portion of the virtual registered sphere in an image capture camera view, determine whether images of the three-dimensional object have been captured to a predetermined satisfactory degree from a particular range of image capture angles associated with a particular patch, and assign a color to the particular patch based at least in part on the determination of whether images of the three-dimensional object have been captured to the predetermined satisfactory degree from the particular range of image capture angles associated with the particular patch.

It should be appreciated that aspects of the disclosure previously described may be implemented in conjunction with the execution of instructions (e.g., applications) by processor 101 of computing device 100, as previously described. Particularly, circuitry of the device, including but not limited to processor, may operate under the control of an application, program, routine, or the execution of instructions to execute methods or processes in accordance with embodiments of the disclosure (e.g., the processes of FIG. 3). For example, such a program may be implemented in firmware or software (e.g., stored in memory and/or other locations) and may be implemented by processors and/or other circuitry of the devices. Further, it should be appreciated that the terms processor, microprocessor, circuitry, controller, etc., refer to any type of logic or circuitry capable of executing logic, commands, instructions, software, firmware, functionality, etc.

The teachings herein may be incorporated into (e.g., implemented within or performed by) a variety of apparatuses (e.g., devices). For example, one or more aspects taught herein may be incorporated into a general computing device, a desktop computer, a mobile computer, a mobile device, a phone (e.g., a cellular phone), a personal data assistant, a tablet, a laptop computer, a tablet, an entertainment device (e.g., a music or video device), a headset (e.g., headphones, an earpiece, etc.), a medical device (e.g., a biometric sensor, a heart rate monitor, a pedometer, an EKG device, etc.), a user I/O device, a computer, a server, a point-of-sale device, an entertainment device, a set-top box, or any other suitable device.

In some aspects a wireless device may comprise an access device (e.g., a Wi-Fi access point) for a communication system. Such an access device may provide, for example, connectivity to another network through transceiver (e.g., a wide area network such as the Internet or a cellular network) via a wired or wireless communication link. Accordingly, the access device may enable another device (e.g., a Wi-Fi station) to access the other network or some other functionality. In addition, it should be appreciated that one or both of the devices may be portable or, in some cases, relatively non-portable.

It should be appreciated that when the devices are mobile or wireless devices that they may communicate via one or more wireless communication links through a wireless network that are based on or otherwise support any suitable wireless communication technology. For example, in some aspects the wireless device and other devices may associate with a network including a wireless network. In some aspects the network may comprise a body area network or a personal area network (e.g., an ultra-wideband network). In some aspects the network may comprise a local area network or a wide area network. A wireless device may support or otherwise use one or more of a variety of wireless communication technologies, protocols, or standards such as, for example, 3G, LTE, LTE Advanced, 4G, CDMA, TDMA, OFDM, OFDMA, WiMAX, and Wi-Fi. Similarly, a wireless device may support or otherwise use one or more of a variety of corresponding modulation or multiplexing schemes. A wireless device may thus include appropriate components (e.g., air interfaces) to establish and communicate via one or more wireless communication links using the above or other wireless communication technologies. For example, a device may comprise a wireless transceiver with associated transmitter and receiver components (e.g., a transmitter and a receiver) that may include various components (e.g., signal generators and signal processors) that facilitate communication over a wireless medium. As is well known, a mobile wireless device may therefore wirelessly communicate with other mobile devices, cell phones, other wired and wireless computers, Internet web-sites, etc.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill in the art would further appreciate that the various illustrative logical blocks, modules, engines, circuits, and algorithm steps described in connection with the embodiments disclosed herein may be implemented as electronic hardware, computer software, or combinations of both. To clearly illustrate this interchangeability of hardware and software, various illustrative components, blocks, modules, engines, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software as a computer program product, the functions or modules may be stored on or transmitted over as one or more instructions or code on a non-transitory computer-readable medium. Computer-readable media can include both computer storage media and communication media including any medium that facilitates transfer of a computer program from one place to another. A storage media may be any available media that can be accessed by a computer. By way of example, and not limitation, such non-transitory computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of non-transitory computer-readable media.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A method for providing visual guidance to a user capturing images of a three-dimensional object comprising:
    generating a plurality of virtual registered spheres, wherein each sphere corresponds to a particular camera distance from the three-dimensional object and comprises a plurality of contiguous patches, wherein each of the plurality of patches corresponds to a continuous range of image capture angles;
    selecting a particular virtual registered sphere corresponding to a current camera distance for rendering based on the current camera distance from the three-dimensional object;
    rendering at least a portion of the selected virtual registered sphere in an image capture camera view;
    determining whether images of the three-dimensional object have been captured to a predetermined satisfactory degree at the current camera distance and from a particular range of image capture angles associated with a particular patch of the selected virtual register sphere; and
    assigning a color to the particular patch based at least in part on the determination of whether images of the three-dimensional object have been captured to the predetermined satisfactory degree at the current camera distance and from the particular range of image capture angles associated with the particular patch of the selected virtual register sphere.

2. The method of claim 1, wherein in response to a determination that images of the three-dimensional object have not been captured to the predetermined satisfactory degree at the current camera distance and from the particular range of image capture angles associated with the particular patch, the particular patch is assigned a first color, and
    in response to a determination that images of the three-dimensional object have been captured to the predetermined satisfactory degree at the current camera distance and from the particular range of image capture angles associated with the particular patch, the particular patch is assigned a second color different from the first color.

3. The method of claim 2, wherein the first color is red, and the second color is green.

4. The method of claim 1, wherein the determining of whether images of the three-dimensional object have been captured to the predetermined satisfactory degree at the current camera distance and from the particular range of image capture angles associated with the particular patch comprises determining a quality of a portion of a dataset generated from images of the three-dimensional object captured at the current camera distance and from the particular range of image capture angles associated with the particular patch.

5. The method of claim 4, wherein the assigning of a color to the particular patch comprises assigning one of a plurality of colors to the particular patch based at least in part on the quality of the portion of the dataset generated from images of the three-dimensional object captured at the current camera distance and from the particular range of image capture angles associated with the particular patch.

6. The method of claim 5, wherein a first, second, and third colors are assigned to the patches, the first, second, and third colors indicating a first, second, and third qualities of a first, second, and third portions of the dataset, respectively, and wherein the first quality is lower than the second quality, and the second quality is lower than the third quality.

7. The method of claim 1, further comprising rendering one or more color-coded symbols on at least one patch of the virtual registered sphere, wherein the symbols indicate camera distances from the three-dimensional object different from the current camera distance, and colors of the symbols indicate dataset qualities from the angles associated with the patch and at the camera distances as indicated by the symbols.

8. An apparatus for providing visual guidance to a user capturing images of a three-dimensional object comprising:
a memory; and
a processor to:
generate a plurality of virtual registered spheres, wherein each sphere corresponds to a particular camera distance from the three-dimensional object and comprises a plurality of contiguous patches, wherein each of the plurality of patches corresponds to a continuous range of image capture angles,
select a particular virtual registered sphere corresponding to a current camera distance for rendering based on the current camera distance from the three-dimensional object;
render at least a portion of the selected virtual registered sphere in an image capture camera view,
determine whether images of the three-dimensional object have been captured to a predetermined satisfactory degree at the current camera distance and from a particular range of image capture angles associated with a particular patch of the selected virtual register sphere, and
assign a color to the particular patch based at least in part on the determination of whether images of the three-dimensional object have been captured to the predetermined satisfactory degree at the current camera distance and from the particular range of image capture angles associated with the particular patch of the selected virtual register sphere.

9. The apparatus of claim 8, wherein in response to a determination that images of the three-dimensional object have not been captured to the predetermined satisfactory degree at the current camera distance and from the particular range of image capture angles associated with the particular patch, the particular patch is assigned a first color, and
in response to a determination that images of the three-dimensional object have been captured to the predetermined satisfactory degree at the current camera distance and from the particular range of image capture angles associated with the particular patch, the particular patch is assigned a second color different from the first color.

10. The apparatus of claim 9, wherein the first color is red, and the second color is green.

11. The apparatus of claim 8, wherein the determining of whether images of the three-dimensional object have been captured to the predetermined satisfactory degree at the current camera distance and from the particular range of image capture angles associated with the particular patch comprises determining a quality of a portion of a dataset generated from images of the three-dimensional object captured at the current camera distance and from the particular range of image capture angles associated with the particular patch.

12. The apparatus of claim 11, wherein the assigning of a color to the particular patch comprises assigning one of a plurality of colors to the particular patch based at least in part on the quality of the portion of the dataset generated from images of the three-dimensional object captured at the current camera distance and from the particular range of image capture angles associated with the particular patch.

13. The apparatus of claim 12, wherein a first, second, and third colors are assigned to the patches, the first, second, and third colors indicating a first, second, and third qualities of a first, second, and third portions of the dataset, respectively, and wherein the first quality is lower than the second quality, and the second quality is lower than the third quality.

14. The apparatus of claim 8, wherein the processor is to further render one or more color-coded symbols on at least one patch of the virtual registered sphere, wherein the symbols indicate camera distances from the three-dimensional object different from the current camera distance, and colors of the symbols indicate dataset qualities from the angles associated with the patch and at the camera distances as indicated by the symbols.

15. A non-transitory computer-readable medium including code that, when executed by a processor, causes the processor to:
generate a plurality of virtual registered spheres, wherein each sphere corresponds to a particular camera distance from a three-dimensional object and comprises a plurality of contiguous patches, wherein each of the plurality of patches corresponds to a continuous range of image capture angles;
select a particular virtual registered sphere corresponding to a current camera distance for rendering based on the current camera distance from the three-dimensional object;
render at least a portion of the selected virtual registered sphere in an image capture camera view,
determine whether images of the three-dimensional object have been captured to a predetermined satisfactory degree at the current camera distance and from a particular range of image capture angles associated with a particular patch of the selected virtual register sphere, and
assign a color to the particular patch based at least in part on the determination of whether images of the three-dimensional object have been captured to the predetermined satisfactory degree at the current camera distance and from the particular range of image capture angles associated with the particular patch of the selected virtual register sphere.

16. The non-transitory computer-readable medium of claim 15, wherein in response to a determination that images of the three-dimensional object have not been captured to the predetermined satisfactory degree at the current camera distance and from the particular range of image capture angles associated with the particular patch, the particular patch is assigned a first color, and
in response to a determination that images of the three-dimensional object have been captured to the predetermined satisfactory degree at the current camera distance and from the particular range of image capture angles associated with the particular patch, the particular patch is assigned a second color different from the first color.

17. The non-transitory computer-readable medium of claim 16, wherein the first color is red, and the second color is green.

18. The non-transitory computer-readable medium of claim 15, wherein the determining of whether images of the three-dimensional object have been captured to the predetermined satisfactory degree at the current camera distance and from the particular range of image capture angles associated with the particular patch comprises determining a quality of a portion of a dataset generated from images of the three-dimensional object captured at the current camera distance and from the particular range of image capture angles associated with the particular patch.

19. The non-transitory computer-readable medium of claim 18, wherein the assigning of a color to the particular patch comprises assigning one of a plurality of colors to the particular patch based at least in part on the quality of the portion of the dataset generated from images of the three-dimensional object captured at the current camera distance and from the particular range of image capture angles associated with the particular patch.

20. The non-transitory computer-readable medium of claim 19, wherein a first, second, and third colors are assigned to the patches, the first, second, and third colors indicating a first, second, and third qualities of a first, second, and third portions of the dataset, respectively, and wherein the first quality is lower than the second quality, and the second quality is lower than the third quality.

\* \* \* \* \*